9553X
E. K. Root.
Axe Mach.
Patented Mch. 30. 1836.
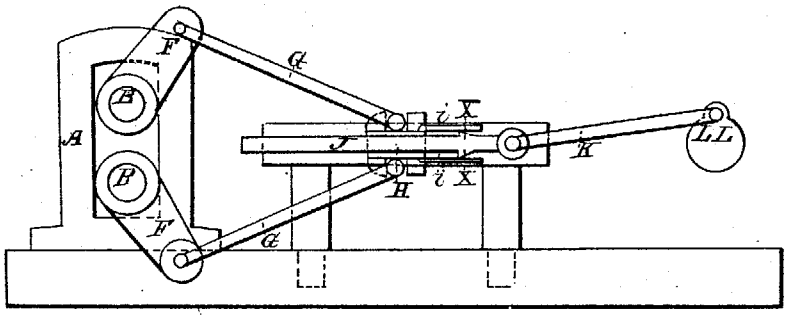
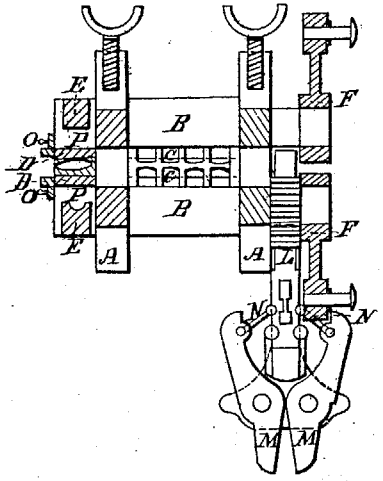
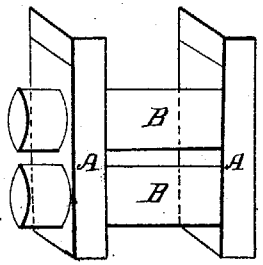

3/30/1836 9553X

Mar. 30. 1836 425

Elisha K. Root of Canton, County of Hartford & State of Connecticut.

The schedule referred to in these Letters Patent, and making part of the same, containing a description in the words of the said Elisha K Root himself of his "Improvement in manufacturing Axes"

To all whom it may concern.

Be it known that I Elisha K Root of Canton in the County of Hartford and State of Connecticut have invented an improvement in the mode of manufacturing Axes, or forging the iron of which the axes are to be made into its proper form; and of doubling and welding the same by pressure between Rollers & otherwise and that the following is a full & exact description of the same. The use of Rollers to form the iron, or their application to the forming Iron for axes is not claimed, but this improvement consists in placing and fastening on dies of suitable form to Rollers which instead of revolving in a rotary manner as has heretofore been done, are made to revolve partly round & back again, & thus compress & mould into proper form one end of the heated Iron, which requires to be twice compressed in two dies successively while the other end is held by the workman in the tongs; and then by changing ends of the pattern of Iron to compress & form the other end of it between two other dies as before, which dies correspond as right and left handed ends of the same pattern, — and after each compression thus performed, the Rollers by their returning motion render back the pattern of heated Iron to the workman. And while the iron is yet hot it is bent and doubled in another part of the machine, and compressed into a suitable form for welding, then the heat being suitably raised or increased the pattern is welded by another compression ~~between~~ another pair of dies, which at the same time give the proper form to the bit of the axe to receive the steel. — All the subsequent operations of welding in the steel and finishing the axes are done in the usual way by the hammer. — For the first operation above named, a pair of strong iron Rollers are placed in a strong iron frame as is usual in rolling mills, and the boxes of the upper roller made moveable by strong setting screws to set the rollers at suitable distance from each other, but in this arrangement the surface of the rollers should be much farther apart than those

3/30/1836 9553X of common rolling mills, so as to admit a pair of dies to be fastened by screws or otherwise to the rollers — the plate of each of these dies should be from one and a half to three inches thick, and these dies I consider to be best made of cast iron, with suitable indentations or depressions and projections to suit the desired form of the work, and so placed on the rollers as to meet and agree with each other — The journals or gudgeons of the rollers pass through or by the frame which sustains them, at both ends so as to project about eight or twelve inches on each end outside of the frame. — Motion is given to the rollers by strong levers or cams attached to their projecting ends on one side of the frame, and these levers are connected by sweeps to a crank on the shaft of a fly wheel, by which means an alternate motion forward and backward is given to the rollers, and the sweeps are so connected with the crank as to be easily disconnected at pleasure to stop the motion of the Rollers & other works, & to set them in motion again with equal facility. On the lower roller at its projecting end, back of the lever, & between the lever & the frame is placed the segment of a pinion which gears into a rack which is thereby made to slide back and forth alternately as the rollers move back and forth, the rack with its slide is connected to a pair of strong iron jaws which are by that means opened and shut, moving a short distance, but with great force — This rack & slide also moves a large punch, or tongue of iron into a recess between two small rollers, placed about three or four inches apart, and the punch enters & recedes about three or four inches between them, & the heated pattern after being plated and formed between the dies on the large rollers, is placed in front of the recess between these small rollers, & the thickest part of the pattern is thrust forward by the punch which thus bends or doubles the pattern, which is then placed between the jaws before described, which are more open at their outer ends & approach nearer & nearer together to their fulcrum; and by some successive compressions between these jaws beginning at their outer ends, the pattern is bent more and more closely until the eye and head of the axe is formed suitably for welding. On the projecting ends of the large rollers, and on the outside of the frame opposite to the levers which move the rollers are placed a pair of projections suitable to upset and form the ends of the axe, and also a pair of narrow dies suitable to form the lateral edges or bevels of it; and also another pair of broad dies to compress and weld the "bit" of the
axe and at the same time to shape it flatwise in an oval and proper form —
ready for slitting to receive the steel. —— There are several different ways of
giving an alternating & backward & forward motion to the rollers, and also of
engaging and disengaging the scrapes with the fly wheel crank which would
suggest themselves to any competent mechanic but I prefer the method herein
after described & exemplified in the model, & illustrated in the drawing annex-
-ed as being better than any other. Lett I, I, represent the crank on the end of
the fly wheel shaft, with its wrist or pin — to which is attached the main scrape
K; which is connected with the sliding rod J. by a joint & which rod has two
projections or shoulders at X.X. — this rod is fitted to slide easily through the
carriage H. and this carriage also slides freely on ways within the frame.
to this carriage is attached by joints two latches ii. which fit the shoulders
on the sliding rod & catch against them when the latches are brought in against
the sliding rod, but when thrown out from the rod one or two inches the latches
will pass by the shoulders, & while they remain out, no motion is communi-
-cated to the carriage, but the sliding rod slips through it back & forth to no
effect; but when the latches are dropped in upon the rod they catch the shoulders
& move the carriage, and to the carriage are connected two scrapes by joints
G.G. these also are connected at their other ends to the — levers or cams E.E. on the
ends of the rollers, & the latches are so connected with a treadle or foot-piece
as to be easily let fall on to the rod or thrown out from it, & thus cause the rollers
to move or rest at the pleasure of the workman. —— Whenever the rollers move;
the rack and slide move also, to the slide L are connected two "Toggle" joints n.n.
which by their motion open & shut the jaws M.N. in a forcible manner. —
The rack & Slide also gives motion to the punch, which passing into a recess between
two small rollers bends or doubles the pattern as before described, and this punch
is very naturally and easily connected with the slide by any competent mec-
-hanic. What I claim as my improvement and invention, is the use of rollers
with Metallic dies attached to one side of each of them, and moved forward &
backward in the plating and welding & forming the Iron for axes to prepare it
to receive the steel, and also the manner of doubling the patterns by a punch passing

3/30/1836 9553X

425.

between two small rollers, and afterwards completing the doubling by compression between two jaws both of which move alike in approaching each other; and also the method herein described for connecting and disconnecting the crank and rolling Witnesses
Edd. Saml. H. Collins
W. G. Reuben Kind Canton Feby. 9. 1836.

Elisha K. Root.

(1485 words)

Patented March 30 1836

Drawing